US007189326B2

(12) United States Patent
Domard et al.

(10) Patent No.: US 7,189,326 B2
(45) Date of Patent: Mar. 13, 2007

(54) USE OF MATERIAL BASED ON ORGANIC AND/OR INORGANIC FIBRES AND CHITOSAN FOR FIXING METAL IONS

(75) Inventors: Alain Domard, Lyons (FR); Eliane Espuche, Villeurbanne (FR); Severine Despond, Caluira (FR); Noel Cartier, Vienna (FR)

(73) Assignee: Ahlstrom Corporation, Helsinki (FI)

( * ) Notice: Subject to any disclaimer, the term of this patent is extended or adjusted under 35 U.S.C. 154(b) by 0 days.

(21) Appl. No.: 10/484,319

(22) PCT Filed: Jul. 15, 2002

(86) PCT No.: PCT/FR02/02502

§ 371 (c)(1),
(2), (4) Date: Jul. 13, 2004

(87) PCT Pub. No.: WO03/009939

PCT Pub. Date: Feb. 6, 2003

(65) Prior Publication Data
US 2004/0238449 A1 Dec. 2, 2004

(30) Foreign Application Priority Data
Jul. 25, 2001 (FR) .................................. 01 09949

(51) Int. Cl.
*B01D 15/00* (2006.01)
*C02F 1/28* (2006.01)

(52) U.S. Cl. ...................................... 210/679; 210/688

(58) Field of Classification Search ................ 210/679, 210/688, 282, 502.1, 505, 508, 912
See application file for complete search history.

(56) References Cited

U.S. PATENT DOCUMENTS

| 3,635,818 | A | | 1/1972 | Muzzarelli .................. 210/656 |
| 4,992,180 | A | | 2/1991 | Onodera et al. ............ 210/688 |
| 5,010,181 | A | | 4/1991 | Coughlin ..................... 536/20 |
| 5,308,663 | A | * | 5/1994 | Nakagawa et al. ........ 428/34.2 |
| 5,827,610 | A | * | 10/1998 | Ramachandran ............ 428/361 |
| 6,182,834 | B1 | * | 2/2001 | Kim et al. .................. 210/506 |

FOREIGN PATENT DOCUMENTS

| GB | 2165865 | 4/1986 |
| GB | 2338477 | 12/1999 |
| RU | 2 110 858 | 5/1998 |
| WO | WO/00/16877 | 3/2000 |

OTHER PUBLICATIONS

*Braz J. Microbiol.*, Jul./Sep. 2004, vol. 35, No. 3, pp. 243-247 ISSN 1517-8382.
*Water Res..* Sep. 2002; 36(16):4128-36.

* cited by examiner

*Primary Examiner*—Ivars C. Cintins
(74) *Attorney, Agent, or Firm*—Nixon & Vanderhye P.C.

(57) ABSTRACT

The invention concerns the use of a material based on organic and/or inorganic fibres and chitosan for fixing metal ions contained in an effluent. The invention is characterised in that chitosan represents between 0.01 and 20% by dry weight of fibres and its degree of deacetylation is higher than 90%.

6 Claims, 4 Drawing Sheets

Figure 1:
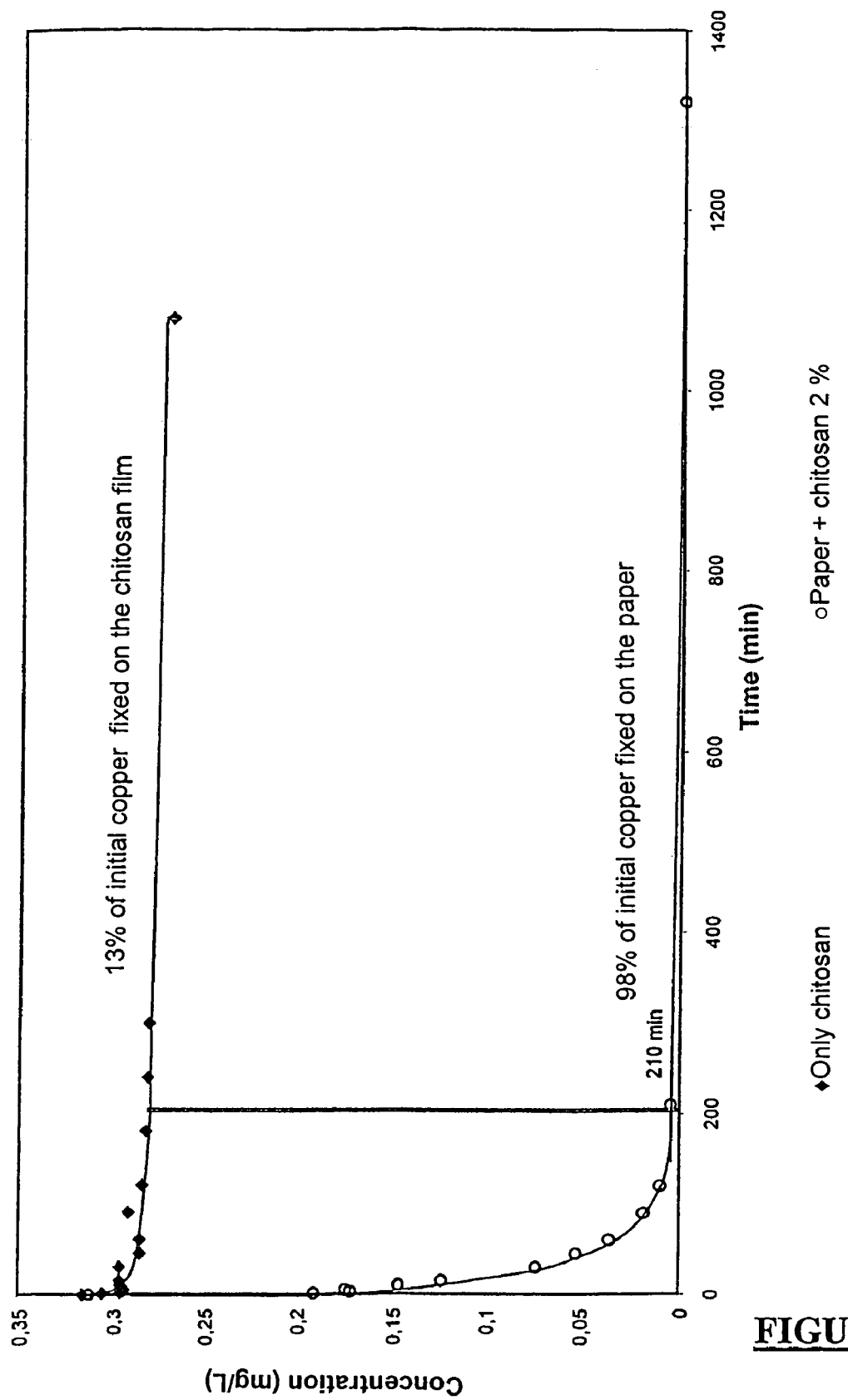

USE OF MATERIAL BASED ON ORGANIC AND/OR INORGANIC FIBRES AND CHITOSAN FOR FIXING METAL IONS

This application is the U.S. national phase of international application PCT/FR02/02502 filed 15 Jul. 2002 which designated the U.S. and claims benefit of FR 0109949, dated 25 Jul. 2001, the entire contents of which are hereby incorporated by reference.

The invention concerns the use of a material based on organic and/or inorganic fibres and chitosan for fixing metal ions contained in a liquid or solid effluent. Among the effluents containing metal ions in considerable proportions or traces thereof if a treatment has first been carried out, the most affected effluents are those coming especially from the mining, nuclear, chemical and surface treatment industry, but also from the agricultural industry like e.g. the liquid manure of pigs or the spreading sludges used as fertilizers and coming from purification plants, but this list is not limitative.

In the rest of the description and in the claims, the expression "organic and/or inorganic fibres" denotes among the organic fibres, especially the cellulose fibres, the synthetic fibres e.g. of the polyester or polyethylene, polypropylene, polyamide, polyvinyl chloride type; the artificial fibres (for example viscose, cellulose acetate); the natural fibres (for example cotton, wool, wood pulp); the carbon fibres (possibly activated), and among the inorganic fibres especially the mineral fibres (for example glass fibres, ceramic fibres).

The chitosan is a deacetylation product of chitin, an element making up the shells of the crabs, lobsters, shrimps or other crustaceans. As we know, the chitosan has sequestering properties of the metal ions when the pH range is higher than 4.

The document WO 90/02708 describes a purification process of polluted aqueous effluents, especially of effluents with high heavy metal content, by means of chitosan in the microcrystalline i.e. modified form. To be more precise, the microcrystalline chitosan is incorporated into a jelly-looking dispersion, which is put into contact with a polluted aqueous effluent. After stirring at a high temperature, the sequestered chitosan with the pollutant is separated from the solution by filtration, sedimentation and centrifugation or by any convenient process. Further, it is shown that the chitosan has a degree of deacetylation over 30%. Considering the microcrystalline form of the chitosan, we can expect that the $NH_2$-functions thereof are implicated in the crystalline lattice thus not available for metallic sequestering. It follows that the pollution removal technique described in this document is not optimal.

The document GB-2 199 315 describes a support structure based on fibres of microbiological origin treated in an alkaline solution whereby the chitin they contain is revealed. According to the described process, the cultivation of mycelium is treated in an alkaline environment before or after being deposited on a synthetic fibre structure of the polyester or polypropylene type.

The document JP 08 13 2037 describes a water purifier, which associates chitosan and activated carbon in a granulated form in a ratio of 1:20. Although it has been shown that the mixture can adsorb the heavy metals, no quantitative information is given. In fact, all the results are given in relation to the capacity of the purifier to eliminate the chlorine contained in the town water.

The document JP 63 04 9212 describes an adsorbent filter consisting of cellulose fibres, of diatoms or pearlite and of chitosan. The cellulose fibres and the diatoms are mixed in a ratio of 4/1-1/4 by weight, and then some more chitosan is added, diluted in an acid solution in an amount of 10% by weight. Here the filter is used for separating colloidal proteins, micro particles and fungi. No information is given concerning the possibility to use this material for fixing heavy metals. Even though it would be used for this application, its efficiency would be lower as the diatoms or the pearlite contain proteins that are able to interact with the amine function of chitosan. In this case, the sequestering properties of the metals by the chitosan are affected.

The document EP-A-0 323 732 describes, furthermore, a composite material based on cellulose fibres, chitosan (in an amount of 1–99% by weight) and fatty acids (0.05–1% in relation to the weight of cellulose fibres). According to an essential characteristic, the chitosan used in this composite material has a degree of deacetylation at least of 40%. At such a degree, and according to this document, the chitosan allows improving the strength of the paper, especially the wet strength thereof. There is no reference made to the possibility of using this material for fixing heavy metals present e.g. in an aqueous effluent. Even though this material would be used for such an application, its efficiency would be low. In fact, the hydrophobic character that the fatty acid gives to the treated paper has an influence on the sorption kinetics of water. By slowing down the diffusion of water into the support, the fatty acid also reduces the sequestering capacity. Thus the accessibility of chitosan is reduced.

The document GB 2 338 477 describes a support based on cellulose and chemical fibres coated with chitosan in an amount of 3–20% by weight. No indication concerning the characteristics of chitosan is mentioned. The support is used for fixing e.g. metal ions of the arsenic, iron sulphate and magnesium chloride type (Ex. 6–8). If the illustrated support has a good metal ion sequestering capacity, it is only for very low effluent flow rates and, in any case, incompatible with an industrial application.

The problem that the invention proposes to solve thus consists in improving the fixation speed of the metal ions and, consequently, the flow rate of the effluent to be treated. However, the Applicant has noticed that the fixation speed of the metal ions could be increased when a low chitosan concentration was combined with a high deacetylation degree, higher than 90%.

Consequently, the invention concerns the use of a material based on organic and/or inorganic fibres and chitosan for fixing metal ions contained in an effluent, and it is characterised in that the chitosan represents between 0.01 and 20% by dry weight of fibres and that its degree of deacetylation is higher than 90%.

The Applicant has in fact noticed that by affecting the concentration and the deacetylation degree of chitosan, the fixation kinetics of metal ions could be considerably modified. If one would expect that by increasing the number of chitosan sites available by deacetylation, the fixation capacity would be increased, then on the other hand, it was not obvious that the fixation speed would improve in the same time.

The fixation of metal ions contained in an effluent can have several applications. First of all, the fixation of heavy metals contained in a liquid effluent can be mentioned. The material is thus used in this case for filtration of liquid effluents by licking or running through depending on the degree of pollution of the effluent. The second matter referred to is the fixation of metal ions present in the soil, especially after a chemical treatment based e.g. on copper, of an agricultural surface. In this case the material, which can correspond to a mulching paper, is used for fixing the metal ions and consequently for avoiding that they are introduced into the ground water level. Finally, the metal ions can fix themselves voluntarily on the material of the invention either for enhancing its conducting properties, or for forming a metal layer by reduction of the fixed metal ions, or for making it a material having biocide properties.

In an advantageous embodiment, the chitosan represents a degree of desacetylation higher than 95%.

In practice, the chitosan has a molecular weight of between $10^4$ and $10^6$ g.mol$^{-1}$, preferably between $10^5$ and $5.10^5$ g.mol$^{-1}$.

In an advantageous embodiment, the chitosan represents between 0.01 and 10%, preferably between 0.01 and 5%, most preferably between 0.01 and 2% by dry weight of the fibres.

As already said, the material is based on organic and/or inorganic fibres, but it can advantageously consist of cellulose fibres.

According to the invention, the material is in the form of a fibrous mat, which can be manufactured according to different processes well known by those skilled in the art.

Thus, in a first embodiment, the chitosan is mixed with the organic and/or inorganic fibres and then a sheet is formed in a paper making way.

In a second embodiment, a sheet is prepared of organic and/or inorganic fibres and then the sheet thus formed is impregnated by means of a chitosan solution, especially with a size-press. One or two sides can be impregnated before spin drying.

In a third embodiment, the sheet based on organic and/or inorganic fibres is coated with a chitosan solution by coating technique used in a paper mill.

The material of the invention can also be in the form of fibre suspension, especially of cellulose treated with chitosan incorporated into a filter cartridge.

In practice, the chitosan is used initially in the form of salt (acetate, hydrochloride etc.).

The invention finds an especially advantageous application in the treatment of drinking water, of effluents coming especially from the mining, nuclear, chemical and surface treatment industry, but also from the agricultural industry like e.g. the liquid manure of pigs or the spreading sludges used as fertilizers and coming from the purification plants, but this list is not limitative.

The invention and the advantages which stem therefrom will become more apparent from the following illustrative examples.

The FIG. 1 shows the fixation kinetics of copper by only chitosan and the material of the invention at a copper concentration of 0.3125 mg/l.

Figure 2:
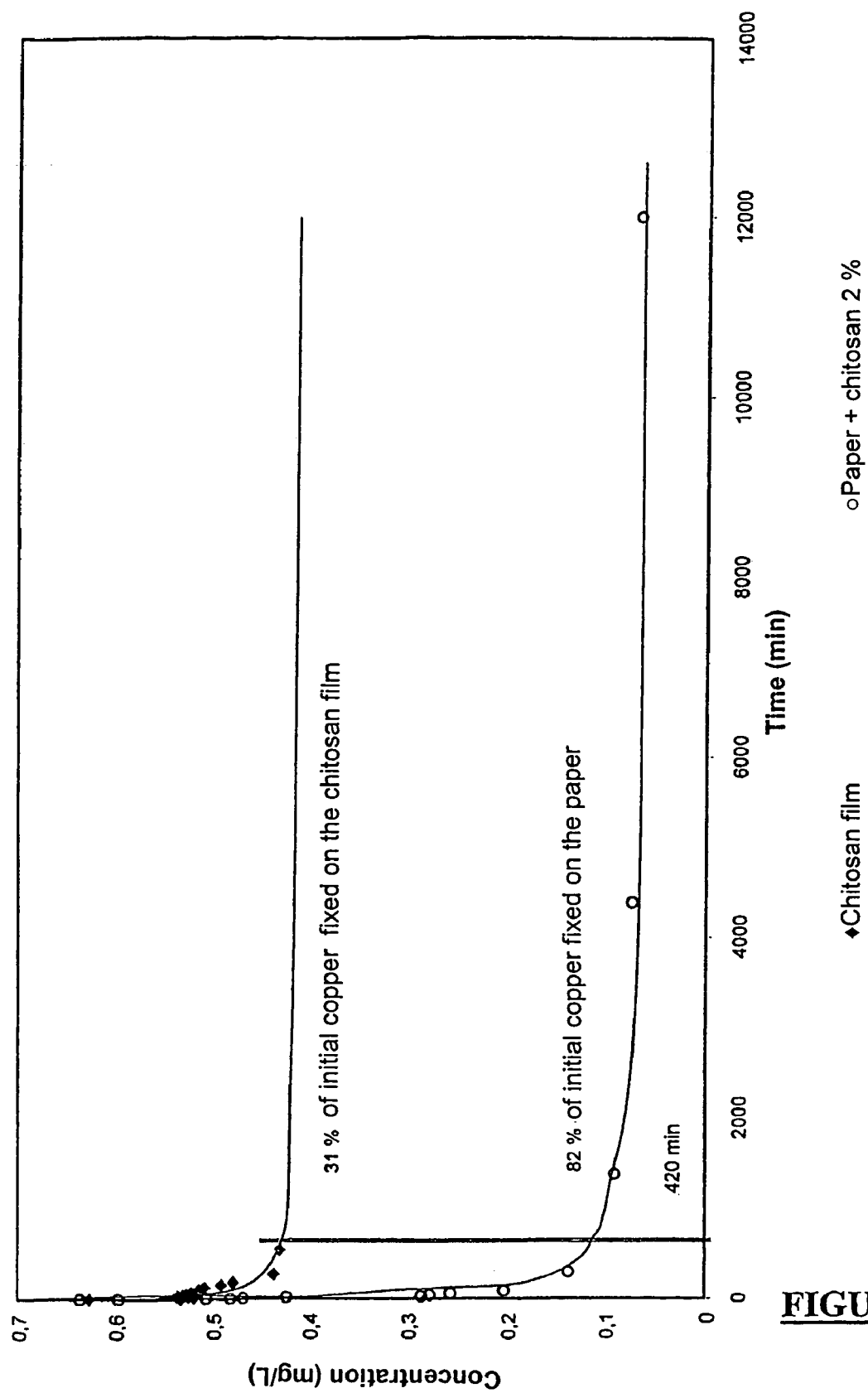

The FIG. 2 shows the fixation kinetics of copper by only chitosan and the material of the invention at a copper concentration of 0.625 mg/l.

Figure 3:
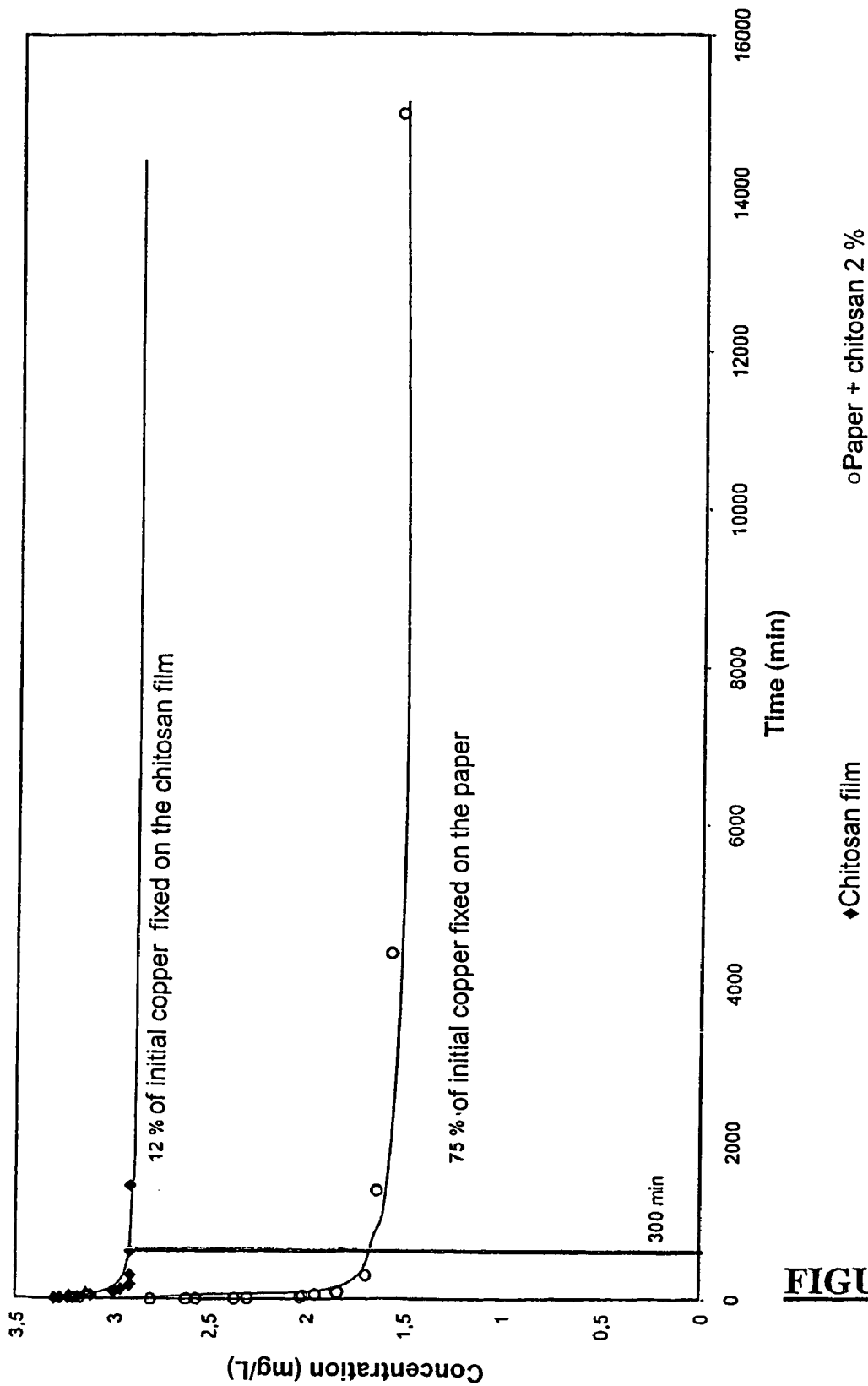

The FIG. 3 shows the fixation kinetics of copper by only chitosan and the material of the invention at a copper concentration of 3.125 mg/l.

Figure 4:
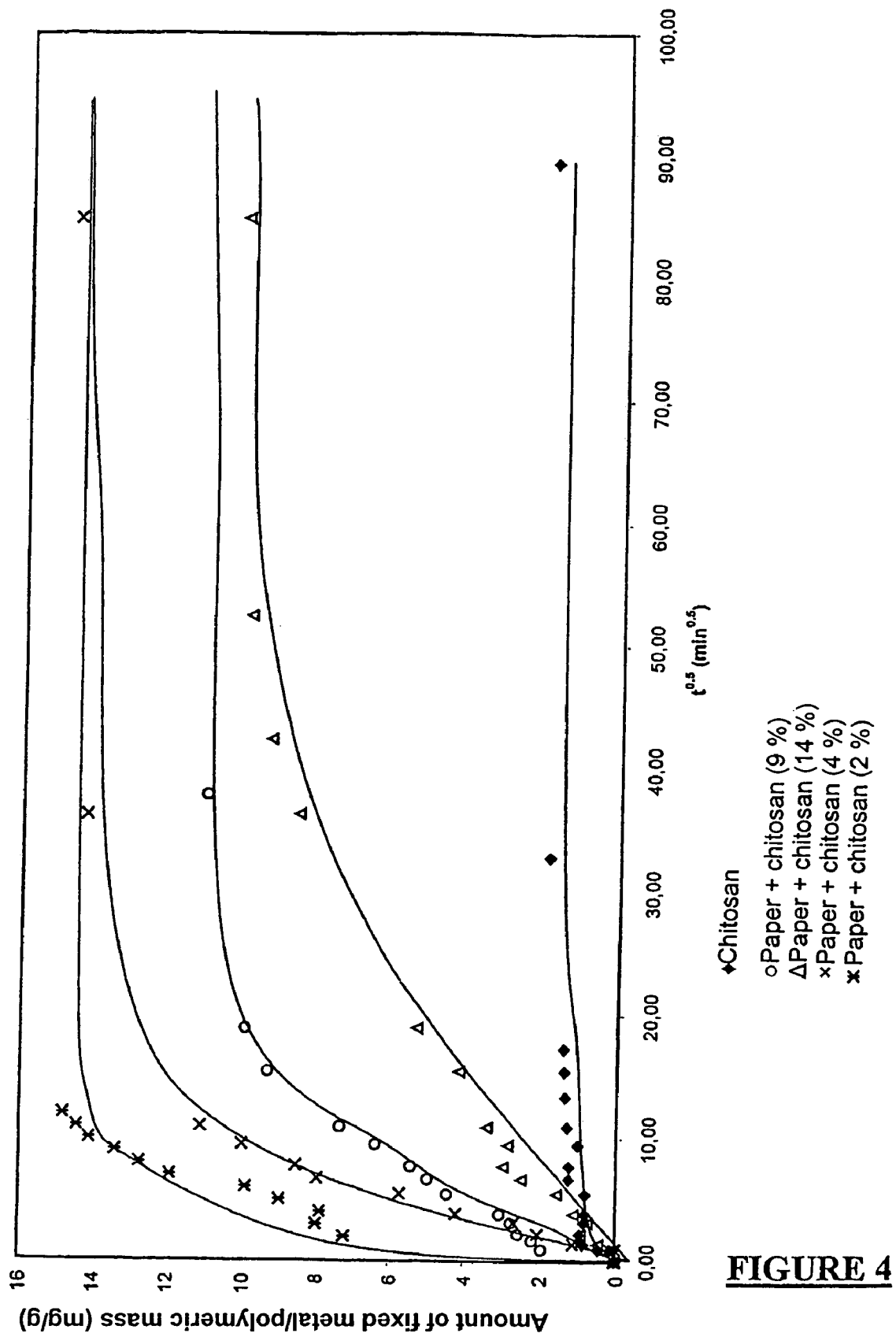

The FIG. 4 shows the influence of the proportion of chitosan in the material of the invention with regard to the fixation of copper ions.

EXAMPLE 1

In this example, the fixation kinetics of copper is compared to only chitosan and to the material of the invention, the mass of the chitosan being 50 mg, in static conditions, that is without an effluent flux coming through the filter.

a/ Chitosan

The chitosan used has a molecular weight of 200 000 g/mol and a degree of deacetylation of 98%.

b/ Material of the Invention

A sheet based on cellulose fibres is coated with the chitosan solution by a coating technique, whereby a support containing 2% of chitosan by weight is obtained.

c/ Protocol only chitosan or chitosan coated on a paper is hydrated during 12 hours in 100 ml of NaNO$_3$-effluent (0.03 M) at a pH of 6.5, a volume V of a copper mother solution is added, the supernatant is taken at different moments, the measure is done by I.C.P. (Inductive Coupled Plasma), finally, the decontamination factor, which corresponds to the Initial Concentration/Final Concentration ratio in the effluent is calculated.

From this factor is deduced the more or less good decontamination function of only chitosan or of the material of the invention on the basis of the following scale:

FD=1: No decontamination

FD=7/8: Good decontamination

FD>10: Very good decontamination.

The study is carried out for decreasing copper concentrations.

As can be seen from the FIG. 1, after 210 minutes, 98% of the copper is fixed on the paper coated with chitosan, as only 13% is fixed on only chitosan for a copper concentration of 0.3125 mg/l.

The FIG. 2 shows that for a copper concentration of 0.625 mg/l, the paper coated with chitosan has already fixed 82% of the copper, as in the same period of time, the chitosan film has fixed only 31% of the copper.

Finally, for a copper concentration of 3.125 mg/l, 75% of the copper is fixed on a paper coated after 360 minutes, as only 12% of the copper is fixed on only chitosan (FIG. 3).

The decontamination factors are calculated and represented in the table below.

| Copper concentration in mg/l | Only chitosan | Material of the invention |
|---|---|---|
| 6.35 | Negligible decontamination | 1.1 |
| 3.175 | 1.07 | 1.43 |
| 0.635 | 1.2 | 3.5 |
| 0.3175 | 1.4 | 9.7 |

Thus it is observed that the fixation capacity of copper by the material of the invention is higher than that of only chitosan, and this concerns all the tested concentrations. It is further noticed that the fixation kinetics of copper on only chitosan is not so rapid than for the material of the invention.

In fact, for a copper concentration of 3.125 mg/l, the decontamination factor of 1.07, obtained after 180 minutes for only chitosan, is obtained after only 4 minutes for the material of the invention.

In the same way, for a copper concentration of 0.625 mg/l, the decontamination factor of 1.2, obtained after 90 minutes for only chitosan, is obtained after only 8 minutes with the material of the invention.

For a copper concentration of 0.3125 mg/l, the decontamination factor of 1.4, obtained after 200 minutes with only chitosan, is obtained after only 20 minutes with the paper of the invention.

EXAMPLE 2

In this example, the influence of the proportion of chitosan in a cellulose sheet with respect to its copper ion fixation capacity is studied.

As can been seen from the FIG. 4, more the chitosan proportion is low, the better is the copper ion fixation capacity of the material of the invention in the studied scale.

EXAMPLE 3

In this example, the efficiency of the filter of the invention is studied in dynamics for a high effluent flow rate.

The filtration system used is the filter press, the most common and the simplest equipment in the field of liquid filtration. The effluent is purified during its passage thorough the filtering medium consisting of a succession of filters. The number of the consecutive filters can be adapted according to the desired performances. In this study, each filter having a surface of 550 cm² consists of a 100 g/m² paper containing 1% of chitosan by mass of the degree of deacetylation of 98%.

The model effluent used is a copper solution of 6.35 mg/l which passes through the filtering medium with a flow rate of 4 200 l/h, the volume of the tested effluent is 10 liters.

The rate of the retained copper, depending on the number of filters used for constituting the filtering medium, is represented in the following table.

| Number of filters | 4 | 8 | 10 |
|---|---|---|---|
| Rate of the retained copper | 64% | 67% | 70% |

With 10 filters, 70% of the copper is fixed within less than 9 seconds.

EXAMPLE 4

In this example, in the same conditions as in the example 3, the influence of the amount of chitosan in the paper filter for concentrations of 1 and 5% are compared in dynamics. The degree of deacetylation is 98%.

| % chitosan | Number of filters | Rate of the retained copper | Amount of the retained copper | Amount of chitosan | Fixation rate of the copper on the chitosan |
|---|---|---|---|---|---|
| 1 | 4 | 64% | 41 mg | 0.2 g | 20% |
| 5 | 4 | 68% | 43 mg | 1 g | 4% |

As can be seen from the table above, the lower the amount of chitosan is in the tested range, the higher the fixation efficiency is.

The invention claimed is:

1. A method of fixing metal ions contained in an effluent comprising the steps of:
 a) forming a fiber mixture consisting essentially of chitosan with organic and/or inorganic fibers by bringing chitosan having a degree of deacetylation higher than 95% into communication with organic and/or inorganic fibers such that the chitosan represents between 0.01 and 10% by dry weight of the fibers,
 b) forming a sheet by means of a paper-machine process from the fiber mixture of chitosan with organic and/or inorganic fibers formed according to step a), and
 c) flowing an effluent containing metal ions into communication with said sheet and allowing the metal ions in the effluent to be fixed to the fibers thereof by means of the chitosan.

2. The method as recited in claim 1 wherein the molecular weight of the chitosan is between $10^4$ and $10^6$ g.mol-1.

3. The method as recited in claim 1 wherein chitosan represents between 0.01 and 2% by dry weight of fibers.

4. The method as recited in claim 1 wherein step a) is practiced such that the fiber mixture consists exclusively of chitosan with cellulose fibers.

5. The method as recited in claim 1 wherein step b) comprises forming a fiber suspension of cellulose fibers treated with chitosan and incorporating the fiber suspension into a filter cartridge.

6. The method as recited in claim 1 wherein the chitosan is in the form of a salt.

* * * * *